United States Patent [19]

Takahashi et al.

[11] Patent Number: 5,724,548
[45] Date of Patent: Mar. 3, 1998

[54] SYSTEM INCLUDING PROCESSOR AND CACHE MEMORY AND METHOD OF CONTROLLING THE CACHE MEMORY

[75] Inventors: Hiromasa Takahashi; Hideyuki Iino, both of Kawasaki, Japan

[73] Assignee: Fujitsu Limited, Kawasaki, Japan

[21] Appl. No.: 469,373

[22] Filed: Jun. 6, 1995

Related U.S. Application Data

[63] Continuation of Ser. No. 859,305, May 18, 1992, abandoned.

[30] Foreign Application Priority Data

Sep. 18, 1990 [JP] Japan .................. 2-246102

[51] Int. Cl.⁶ .................................................. G06F 12/08
[52] U.S. Cl. .................................................. 395/465
[58] Field of Search .......................... 395/403, 455, 395/465, 472

[56] References Cited

U.S. PATENT DOCUMENTS

| | | | |
|---|---|---|---|
| 4,445,174 | 4/1984 | Fletcher | 364/200 |
| 4,620,275 | 10/1986 | Wallach et al. | 364/200 |
| 4,783,736 | 11/1988 | Ziegler | 395/425 |
| 4,809,156 | 2/1989 | Taber | 364/200 |
| 4,888,679 | 12/1989 | Fossum et al. | 364/200 |
| 4,908,748 | 3/1990 | Pathak et al. | 395/400 |
| 4,926,317 | 5/1990 | Wallach et al. | 395/400 |
| 4,942,518 | 7/1990 | Weatherford et al. | 395/800 |
| 5,023,776 | 6/1991 | Gregor | 364/200 |
| 5,063,497 | 11/1991 | Cutler et al. | 395/800 |
| 5,133,059 | 7/1992 | Ziegler et al. | 395/425 |
| 5,148,536 | 9/1992 | Witek et al. | 395/425 |
| 5,261,066 | 11/1993 | Jouppi et al. | 395/425 |
| 5,276,848 | 1/1994 | Gallagher et al. | 395/425 |

FOREIGN PATENT DOCUMENTS

| | | |
|---|---|---|
| 59-14977 | 12/1984 | Japan . |
| 61-264455 | 11/1986 | Japan . |
| 62-47756 | 3/1987 | Japan . |

OTHER PUBLICATIONS

Wallach, Steve, "The CONVEX C-1 64-bit Supercomputer," *COMPCON '86*, Thirty-First IEEE Computer Society International Conference, San Francisco, CA, Mar. 3–6, 1986, pp. 452–457.

Chi, Chi-Hung, "Improving Cache Performance Using a Unified Management of Registers and Cache," *Information Processing 89*, Proceedings of the IFIP 11th World Computer Congress, San Francisco, CA Aug. 28–Sep. 1, 1989, pp. 521–526.

*Primary Examiner*—David L. Robertson
*Attorney, Agent, or Firm*—Staas & Halsey

[57] ABSTRACT

A system comprising a cache memory connected to a processor and a main memory wherein the processor has a unit for outputting a discrimination signal that indicates whether the access to said cache memory is a sequential address data access or a non-sequential address data access, and the cache memory has a unit for changing the processing in a cache-miss state based on the output discrimination signal. In the case of the non-sequential address data access, unnecessary access to the main memory is suppressed to reduce the penalty in the cache-miss state and, hence, to improve the efficiency of the whole system by realizing a high-speed operation.

16 Claims, 10 Drawing Sheets

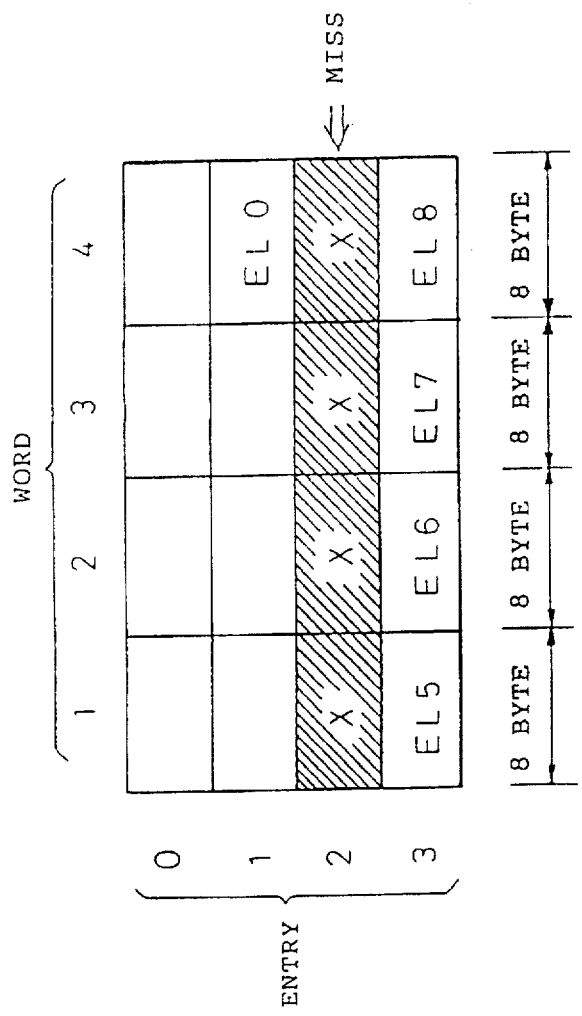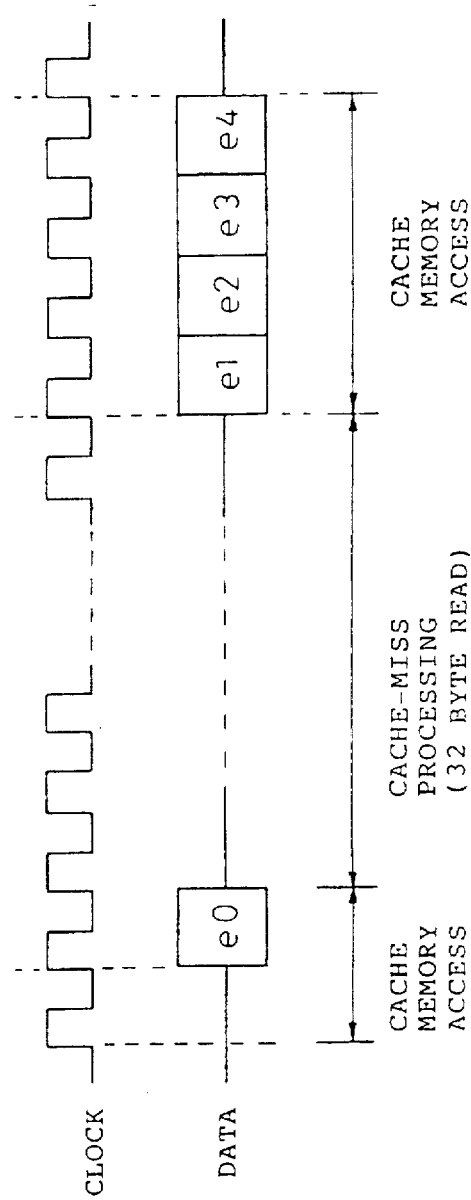
Fig.2a PRIOR ART
Fig.2b PRIOR ART

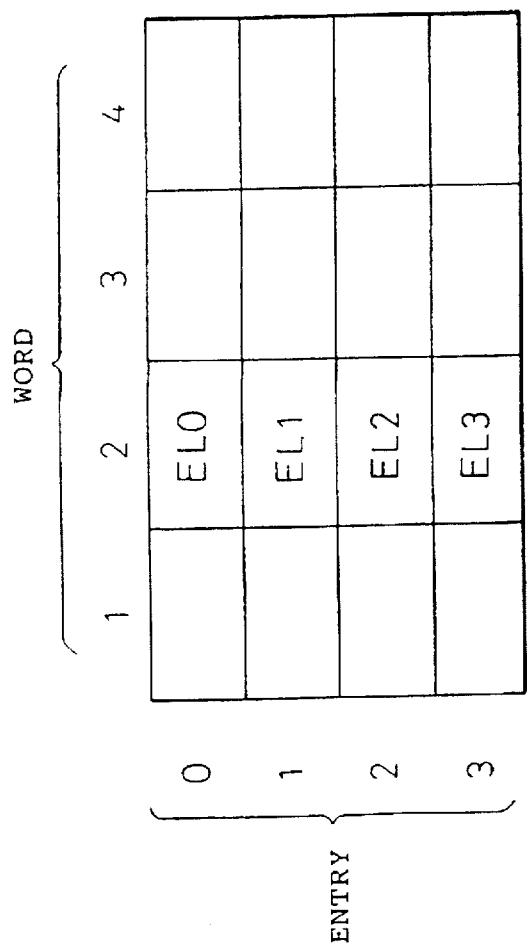
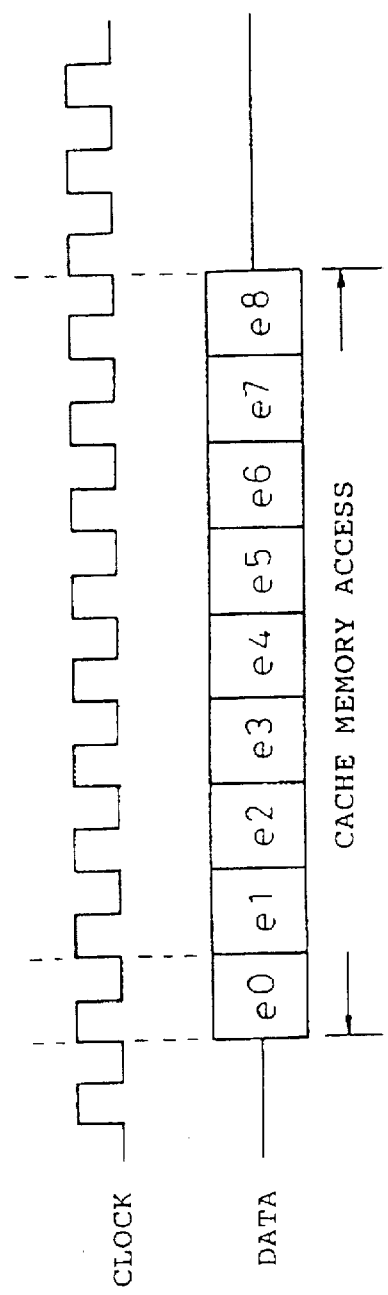
Fig.3a PRIOR ART
Fig.3b PRIOR ART

SYSTEM INCLUDING PROCESSOR AND CACHE MEMORY AND METHOD OF CONTROLLING THE CACHE MEMORY

This application is a continuation of application Ser. No. 07/859,305, filed May 18, 1992, now abandoned.

TECHNICAL FIELD

The present invention relates to a cache memory control system and, particularly, to a technology of controlling a cache memory connected to a processor that gains access to data such as vector data.

If a cache memory that operates normally is connected to a processor that accesses particular data, such as a vector operation type processor that accesses vector data, the speed of the system as a whole is often reduced because of a penalty in the case of a cache miss, thereby making it difficult to increase the speed of processing. It has therefore been desired to provide a control system that reduces the penalty in the case of a cache miss and maintains a high-speed operation even when a cache memory that normally operates is connected to a processor that accesses vector data.

BACKGROUND ART

The cache memory is generally connected between a low speed main memory and a high speed processor such that the processor is allowed to gain access to the data at a high speed.

The cache memory is divided into "entries" called lines, as shown in, for example, FIGS. 1a and 1b. Each entry has a line size of, usually, about 16 bytes or about 32 bytes. In the case of a line size of, for example, 32 bytes or a double precision of 8 bytes as shown in FIG. 1a, four words (data) are stored in each line.

Outline of the cache memory operation is described with reference to a cache memory of a copy back system.

When data exists in the cache memory under the condition that a processor that controls the cache memory is gaining access to the cache memory, i.e., in the case of a "cache hit", the entry including this data is read out from the cache memory at the time of reading, and the above data is written onto the above entry in the cache memory at the time of writing.

On the other hand, when the data to which access is made does not exist in the cache memory, i.e., in the case of a "cache miss" in general, the entry is placed in the cache memory. Concretely speaking, the corresponding entry is read out from the main memory and replaces a corresponding entry in the cache memory.

In this case, the data of an amount of one entry (four data, i.e., data of 32 bytes in the case of double precision data of 8 bytes) must be read out from the main memory to be stored in the cache memory. That is, in the case of a cache miss at the time of read access, the data read out from the main memory is not the data to which access is made but instead consists of data (32 bytes) of one entry that includes the above data. Similarly, even in the case of a cache miss at the time of write access, an entry (32 bytes of data) including the missed (miss-hit) data is read out from the main memory, replacing the corresponding entry in the cache memory and, then, the write data are written thereon.

In an ordinary cache memory, when the processor gains access to the instruction or data, in general, the data to which access is made next are stored, in many cases, in an address near the preceding data. Even when the entry data are cached at the time of a cache miss, the data of the cached entry will be hit with a relatively large probability by an access that is made subsequently.

In the case of memory access for the vector data effected by, for example, the processor of the vector operation type, problems arise as will be described later.

Here, the vector data stands for a set of data of a kind used for the arithmetic operation and in which each of the data is called "element" of vector data. In general, what are frequently used for gaining access to the vector data are a sequential data access and a data access with distance. In the case of, for example, double precision data of 8 bytes, the "sequential data access" represents an access mode such that addresses for the elements are arranged maintaining a distance (stride) of 8 bytes and the elements of vector data are sequentially stored in the memory. On the other hand, the "data access with distance" represents an access mode such that the elements of vector data are arranged not maintaining a distance (stride) of 8 bytes, but maintaining a value that is twice as great and the elements of vector data are stored in the memory maintaining a predetermined gap (distance). For the sake of convenience, the data access mode represented by the data access with distance is called "non-sequential data access" in contrast to "sequential data access".

In the case of sequential data access, one entry of data including data (i.e., element) to which access is made are read out from the main memory and replace the corresponding entry in the cache memory according to a process that is usually performed at the time of a cache miss. In this case, however, the entry that is substituted includes data (element) to which access will be made. Therefore, the data is necessarily hit when access is made thereto. In other words, in the case of the sequential data access, the data to which access will be made next is stored in an address neighboring the address of the preceding data. Therefore, even when the entry data are replaced according to the processing at the time of a cache miss as described above, the data of the replaced entry is reliably hit by the subsequent access, thereby retaining the efficiency of the whole system.

In the case of the non-sequential data access, on the other hand, one entry of data is replaced at the time of a cache miss as described above. In this case, however, the elements of vector data are stored maintaining a predetermined distance (stride), and the replaced entry does not include the data (element) to which access will be made next. In other words, in the case of the non-sequential data access, the data to which access will be made next is stored in an address (another entry in many cases) that is distant, maintaining a predetermined stride from the address of the preceding data. Therefore, even when one entry of data is cached according to a processing at the time of a cache miss, the other data (element) of the cached entry is seldom used by the subsequent access. That is one entry of data read out from the main memory becomes useless excepting the data in the cache-miss state. Therefore, the processing time is lengthened by gaining access to the useless data and the efficiency of the system as a whole is lowered.

DISCLOSURE OF THE INVENTION

It is, therefore, an object of the present invention to improve the efficiency of the system in which a processor is connected to the cache memory to gain access to particular data such as vector data by reducing the penalty at the time of a cache miss in effecting non-sequential data access and, hence, by realizing a high-speed operation.

In order to accomplish this object according to the present invention, the cache memory is controlled by recognizing that the kind of access to the vector data (sequential data access or non-sequential data access) has generally been determined at the time of starting the access and by utilizing the information thereof.

According to a first aspect of the present invention, therefore, there is provided a processor that gains access to data in a cache memory, comprising a unit for outputting a discrimination signal that indicates whether the access made to said cache memory is a sequential address data access or a non-sequential address data access, to thereby control said cache memory.

According to a second aspect of the present invention, furthermore, there is provided a system comprising a cache memory connected to a processor and a main memory, wherein said processor has a unit for outputting a discrimination signal that indicates whether access made to said cache memory is a sequential address data access or a non-sequential address data access, and said cache memory has a unit for changing the processing in a cache-miss state depending upon said discrimination signal, thereby suppressing unnecessary access to said main memory in the case of non-sequential address data access.

According to a third aspect of the present invention, there is provided a method of controlling a cache memory in a system equipped with said cache memory connected to a processor and with a main memory, comprising a step of sending a discrimination signal from said processor to said cache memory indicating whether the access is a sequential address data access or a non-sequential address data access, and a step of changing the processing in a cache-miss state when said discrimination signal is indicating the non-sequential address data access in a cache-miss state.

According to the aforementioned constitution (second aspect of the present invention), the discrimination signal indicating the kind of access is sent from the processor to the cache memory, and the processing in a cache-miss state is changed depending upon the discrimination signal. That is, in the case of the non-sequential data access, unnecessary access to the main memory is suppressed. Therefore, the processing time is shortened by an amount by which the useless access is suppressed, and the efficiency of the system as a whole is improved.

Actions and effects of the first aspect and third aspect of the present invention as well as other structural features and actions of the present invention will be described below in detail byway of an embodiment with reference to the accompanying drawings.

BRIEF DESCRIPTION OF DRAWINGS

FIGS. 2a and 2b are diagrams illustrating a control mode in cache-miss state in the conventional sequential data access;

FIGS. 3a and 3b are diagrams illustrating a control mode in a cache-hit state in the conventional non-sequential data access;

BEST MODE FOR CARRYING OUT THE INVENTION

For a better understanding of the embodiment of the present invention, first, problems inherent in the prior art will be described with reference to FIGS. 1a to 4b.

FIGS. 1a, 1b, 2a and 2b illustrate cache memory control modes during the sequential data access according to the prior art.

Figure 1A:
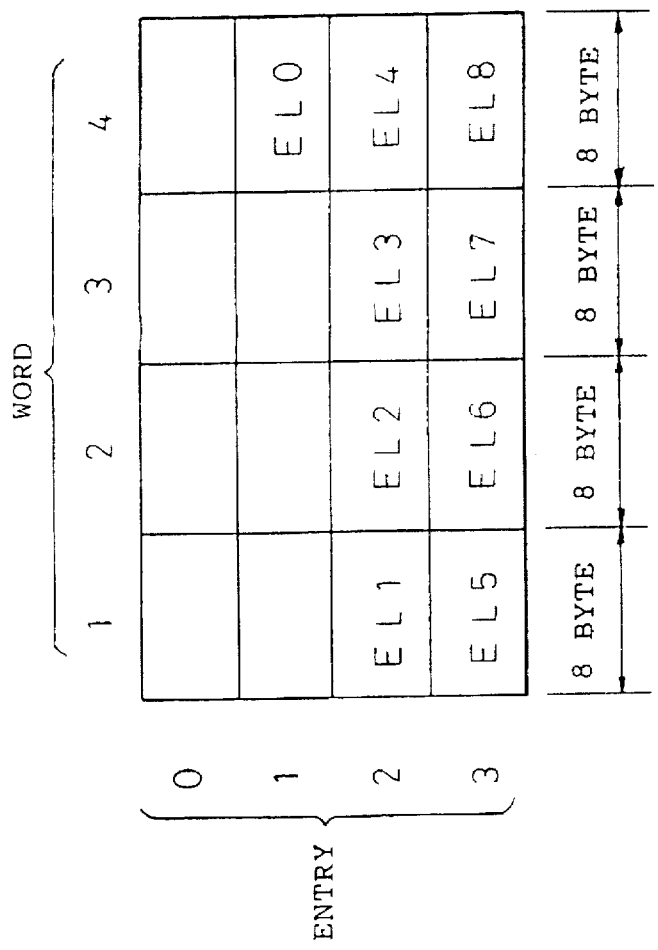
FIGS. 1a and 1b are diagrams illustrating a control mode in cache-hit state in the conventional sequential data access.

In this case as shown in FIG. 1a, the vector data are sequentially stored from the fourth word (element 0; EL0) of an entry 1 in the cache memory.

Figure 1B:
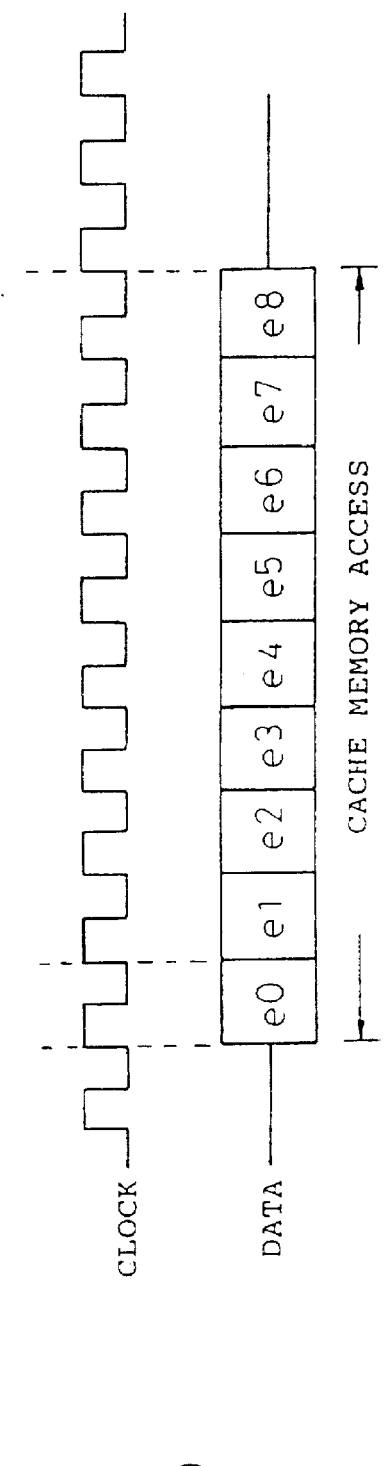

In the case of a cache hit as shown in FIG. 1b, access is made sequentially to the elements (e0 to e8) in response to clocks.

In the case of a cache miss, for example, in the case of a cache miss at an element 1 (EL1) shown in FIG. 2a, the corresponding entry (elements 1 to 4; EL1 to EL4) is read out from the main memory and is stored in the corresponding region of the cache memory. In this case, 8 bytes of data are read out during one access to the main memory. Therefore, access of the main memory is gained four times, and one entry of data (32 bytes) is read out and replaced by a corresponding entry in the cache memory.

In this case, the substituted entry includes the following elements 2 to 4 (EL2 to EL4) and is necessarily hit when access is made to the elements 2 to 4. That is, the data to which access will be gained next is stored in an address neighboring the address of the preceding data. Therefore, even when one entry of data is replaced according to the processing in a cache-miss state, the data of the replaced entry are reliably hit by the subsequent access.

When sequential data access is made as described above, the efficiency of the system as a whole decreases slightly even when a processing (i.e., access to the main memory) similar to that of the ordinary cache memory is carried out.

Next, the cache memory control modes at the time of non-sequential data access will be described with reference to FIGS. 3a, 3b, 4a and 4b.

In the diagram of the embodiment, the elements of vector data are arranged maintaining a distance (stride) of 32 bytes. In this case, since the distance is the same as the line size of the cache memory, the elements (EL0 to EL3) of vector data are arranged in a vertical direction at positions of the second words of the entries as shown in FIG. 3a.

In the case of a cache hit as shown in FIG. 3b, access of the elements (e0 to e8) is sequentially gained in response to clocks.

Figure 4A:
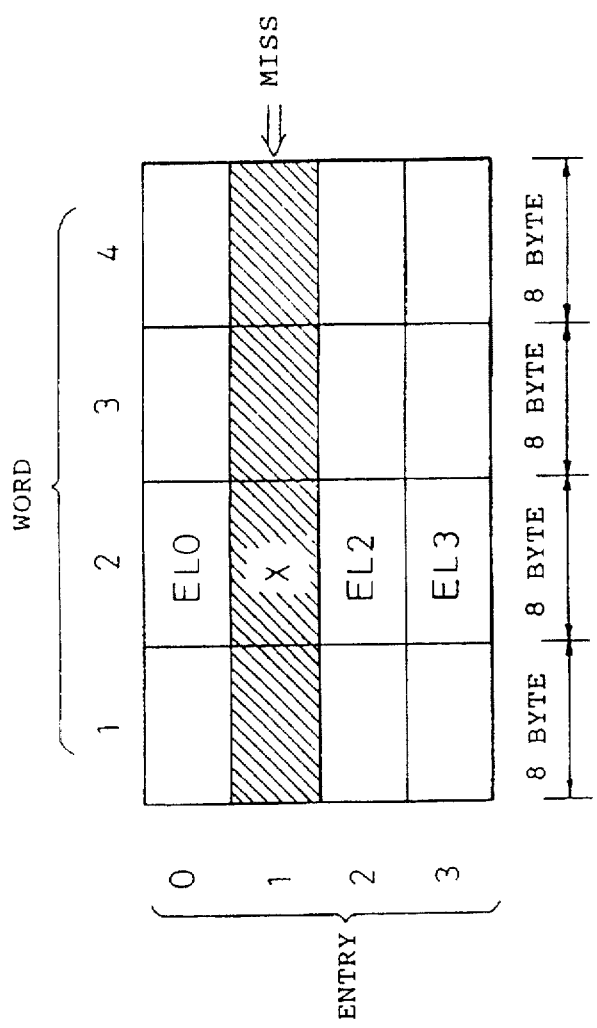
FIGS. 4a and 4b are diagrams illustrating a control mode in a cache-miss state in the conventional non-sequential data access.
Figure 4B:
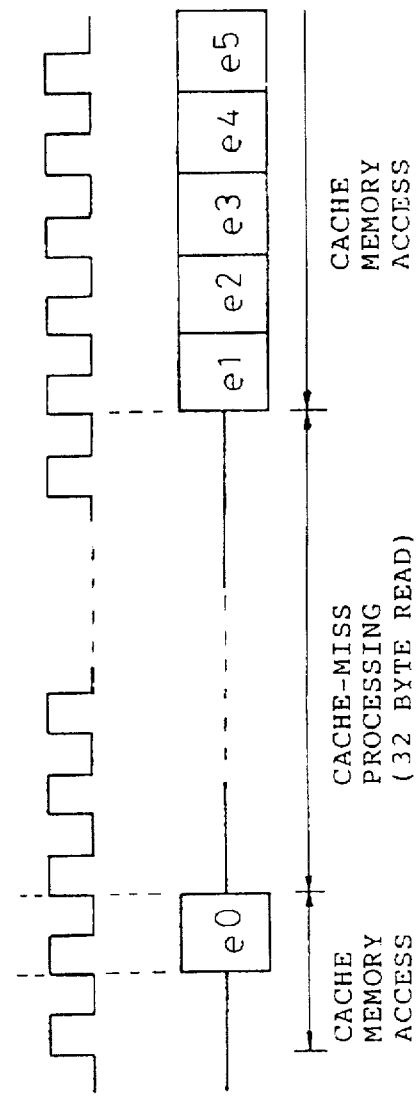

On the other hand, in the case of a cache miss, for example, in the case of a cache miss at the element 1 (EL1)

of FIG. 4a, one entry of data (32 bytes) including the above element is read out from the main memory four access times and is replaced by a corresponding entry in the cache memory.

What is needed by the above entry however is one word of element data (EL1) of the element, and the subsequent elements jump to other entries. Therefore, other words of the replaced entry are not hit by the subsequent access. That is, among 32 bytes of data read out from the main memory, 24 bytes of data (corresponding to three access times) become useless. In other words, the processing time is lengthened by an amount of the access gained to the useless data, and the efficiency of the system decreases as a whole.

Figure 5:
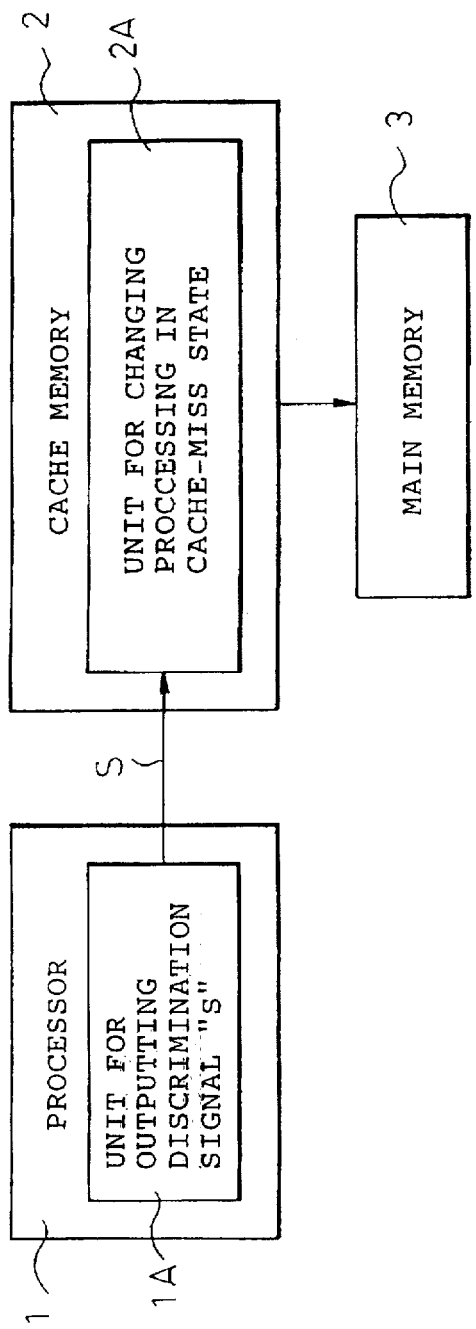
FIG. 5 is a diagram illustrating the principle and constitution of a cache memory control system according to the present invention.

FIG. 5 illustrates the principle and constitution of the cache memory control system according to the present invention, wherein reference numeral 1 denotes a processor that gains access to particular data such as vector data; 2 denotes a cache memory connected to the processor, and 3 denotes a main memory that exchanges data relative to the cache memory.

The processor 1 has a unit 1A for outputting a discrimination signal S that indicates whether access gained to the cache memory 2 is a sequential data access or a non-sequential data access. The cache memory 2 has a unit 2A for changing processing in a cache-miss state based upon the discrimination signal. In the case of the non-sequential data access, unnecessary access to the main memory 3 is suppressed.

A concrete embodiment of the present invention will now be described with reference to FIGS. 6 to 11b.

Figure 6:
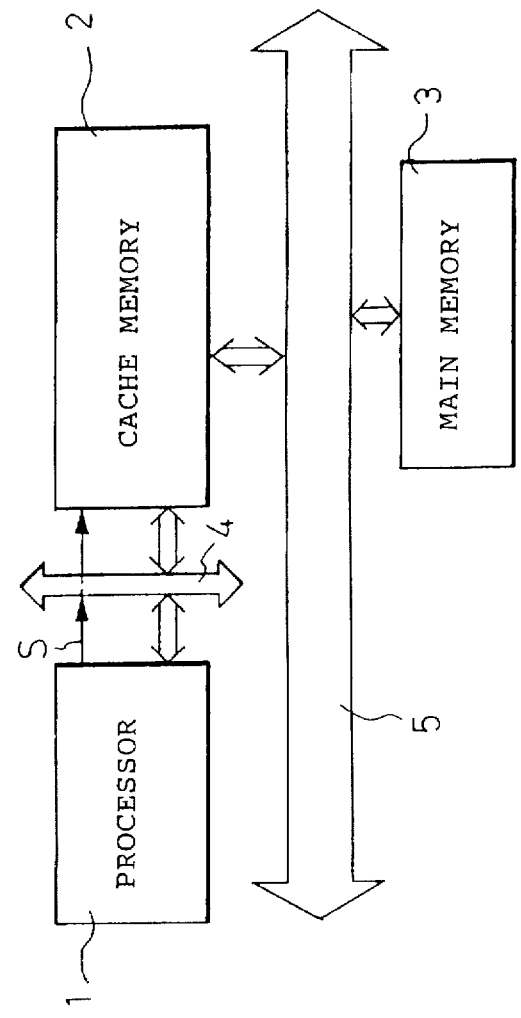
FIG. 6 is a block diagram that schematically illustrates a constitution to which the cache memory control system of the present invention is used.

FIG. 6 schematically illustrates the constitution of a system in which the cache memory control system of the present invention is used.

In FIG. 6, reference numeral 1 denotes a 1-chip vector operation type processor LSI; 2 denotes a cache memory that receives access control from the processor via a processor bus 4, and 3 denotes a main memory that exchanges data and addresses relative to the cache memory 2 via a memory bus 5.

At the time of starting access to the cache memory 2, the processor 1 outputs to the cache memory 2, a signal S (hereinafter referred to as non-sequence access discrimination signal) that indicates the kind of access (i.e., whether it is a sequential data access or a non-sequential data access). Upon receipt of the non-sequence access discrimination signal S, the cache memory 2 changes processing in a cache-miss state. More specifically, when the non-sequence access discrimination signal S indicates non-sequential data access, the cache memory 2 does not update the entry that is in a miss state but gains access directly to the data in the main memory 3.

When the processor 1 gains a sequential data access to the cache memory 2, the non-sequence access discrimination signal S is negated and the operation is performed in the same manner as the conventional cache memory.

In the case of the non-sequential data access, on the other hand, the processor 1 asserts the non-sequence access discrimination signal S and informs the cache memory 2 of the non-sequential access. The control mode of the cache memory of this case will be described later.

Figure 7:
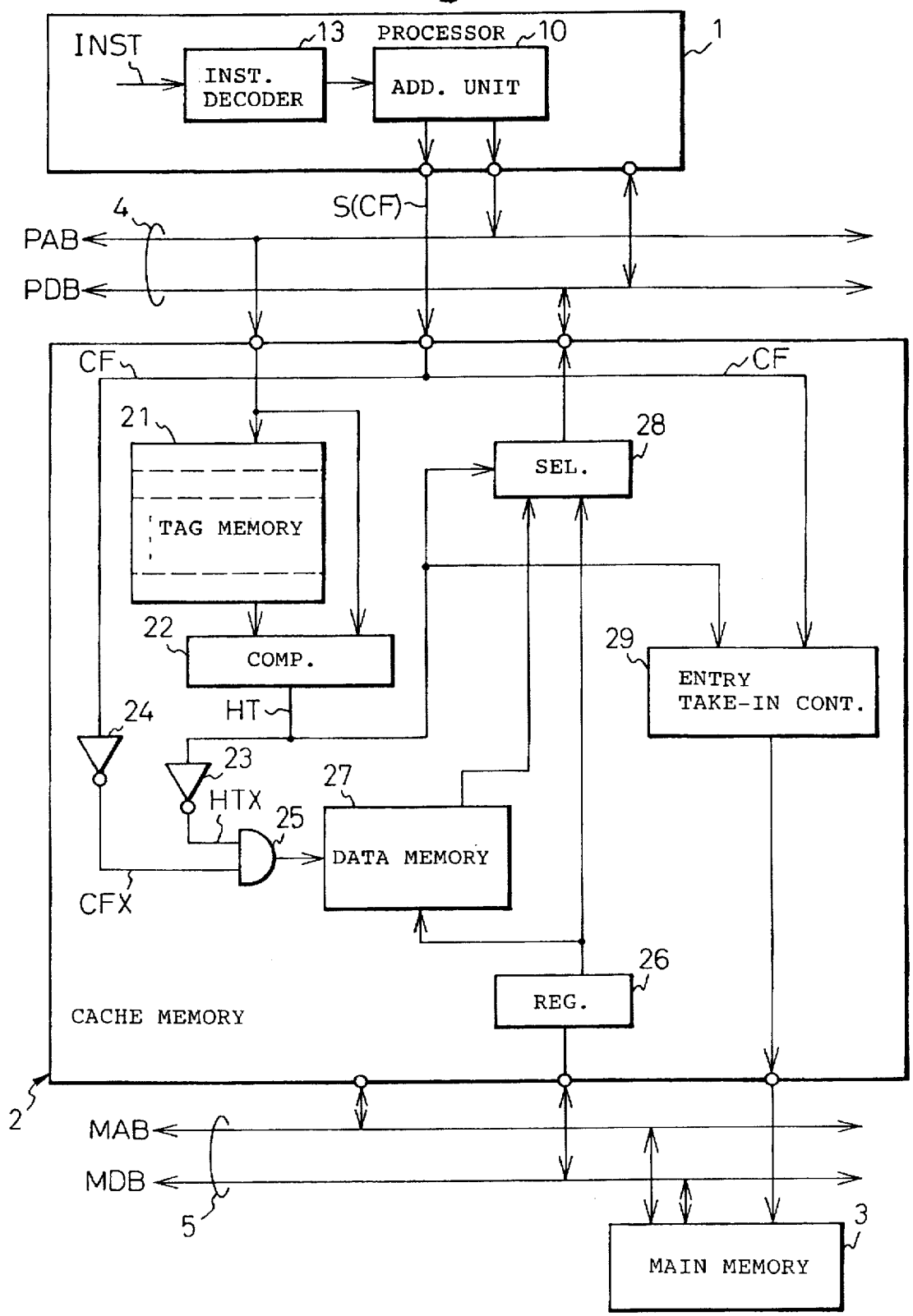
FIG. 7 is a block diagram that illustrates in detail the constitution of the system of FIG. 6.

FIG. 7 illustrates in detail the constitution of the system of FIG. 6, wherein the processor 1 and the cache memory 2 are connected together via a processor bus 4 (address bus PAB and data bus PDB), and the cache memory 2 and the main memory 3 are connected together via a memory bus 5 (address bus MAB and data bus MDB).

As will be described later in detail, the processor 1 has, as part of its constituent elements, an instruction decoder 13 for decoding instruction INST and an address unit 10 that forms the non-sequence access discrimination signal S and effects address conversion based upon the decoded result. Further, the non-sequence access discrimination signal S is used to temporarily freeze or stop the function of the cache memory 2 when asserted and, in this sense, is also called a cache freeze signal CF in the following description.

The cache memory 2 has a tag memory 21 that stores addresses corresponding to the entries taken in via the processor address bus PAB; a comparator 22 that compares the content of the tag memory with the address taken in through the address bus PAB and outputs a cache hit signal (signal HT of the "H" level) when the address that is taken in exists in the addressess stored in the tag memory 21; an inverter 23 that forms an inverted signal HTX of the output of said comparator; an inverter 24 that forms an inverted signal CFX of the cache freeze signal CF from the processor 1, an AND gate 25 that forms a cache freeze control signal in response to the outputs of the inverters 23 and 24; a register 26 that temporarily stores the data taken in via the memory data bus MDB based upon the entry take-in control, which will be mentioned later, a data memory 27 that takes in or retrieves the data from the register 26 in response to the cache freeze control signals from the AND gate 25, a selector 28 that selects either the data from the data memory 27 or the data from the register 26 depending upon the output HT of the comparator 22 and sends it to the processor data bus PBD; and an entry take-in control circuit 29 that controls the take-in of one entry of data from the main memory 3 depending upon the output HT of the comparator 22 and the cache freeze signal CF.

In this constitution, when the cache freeze signal CF is negated (i.e., inverted signal CFX has the "H" level) in a cache-miss state (i.e., inverted signal HTX has the "H" level) during the sequential data access, the output (cache freeze control signal) of the AND gate 25 assumes the "H" level, and the data memory 27 receives the data from the register 26 in response thereto. On the other hand, when the cache freeze signal CF is asserted (i.e., inverted signal CFX has the "L" level) during the non-sequential data access or in the case of a cache-hit (i.e., inverted signal HTX has the "L" level), the above cache freeze control signal becomes invalid (L level) and the memory 27 inhibits the take-in of data from the register 26. Further, the selector 28 selects and outputs the data from the data memory 27 when the output HT of the comparator 22 has the "H" level (i.e., in the case of a cache hit), and selects and outputs the data from the register 26 when the output HT of the comparator 22 has the "L" level (i.e., in the case of a cache miss).

Figure 8:
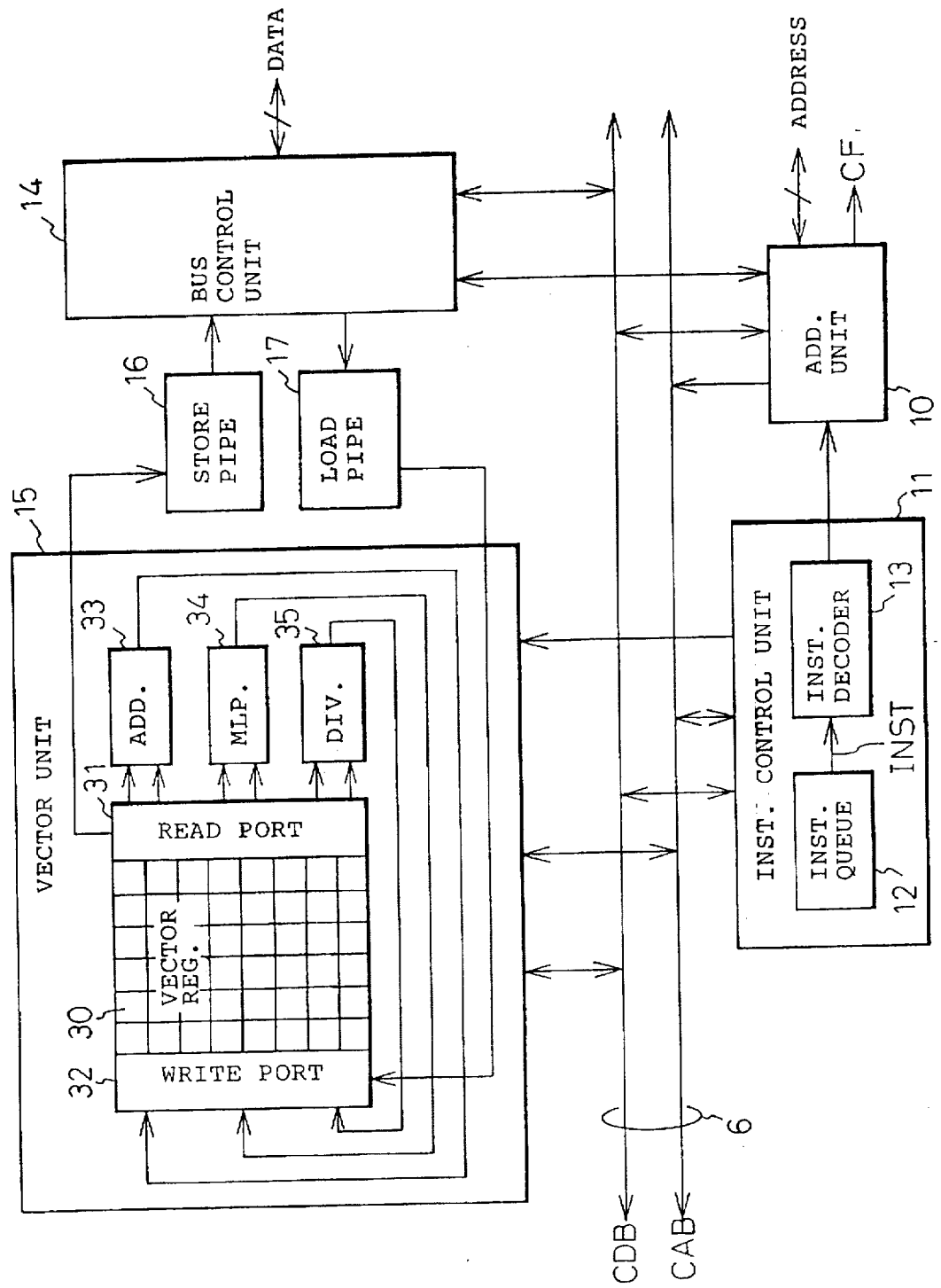
FIG. 8 is a block diagram that illustrates in detail the constitution of the processor of FIG. 7.

FIG. 8 illustrates in detail the constitution of the processor 1.

The diagram of the processor is a 1-chip vector operation type processor LSI as described above and comprises a chip bus 6 (address bus CAB and data bus CDB), an address unit 10 connected to the chip bus 6, an instruction control unit 11 connected to the chip bus 6, a bus control unit 14 connected to the chip data bus CDB, a vector unit 15 connected to the chip bus 6, and a store pipe 16 and a load pipe 17 that are connected between the vector unit and the bus control unit 14 to control the pipeline processing. Here, the instruction control unit 11 has an instruction queue (buffer) 12 that issues an instruction INST and an instruction decoder 13 that decodes the instruction INST and sends the decoded result to the address unit 10.

The vector unit 15 has a vector register 30 for storing the vector data, a read port 31 for reading out the data from the vector register, a write port 32 for newly writing data onto the vector register 30, an adder 33, a multiplier 34 and a divider 35 that effect the addition, multiplication and division of data that are read out via the read port 31. The aforementioned store pipe 16 stores the data read out from the vector register 30 via the read port 31 and sends the data to the bus control unit 14 after having effected a suitable pipeline processing. The load pipe 17, on the other hand, loads the data that are taken in from the processor data bus PDB via bus control unit 14, similarly effects a suitable pipeline processing, and sends the data to the write port 32.

Figure 9:
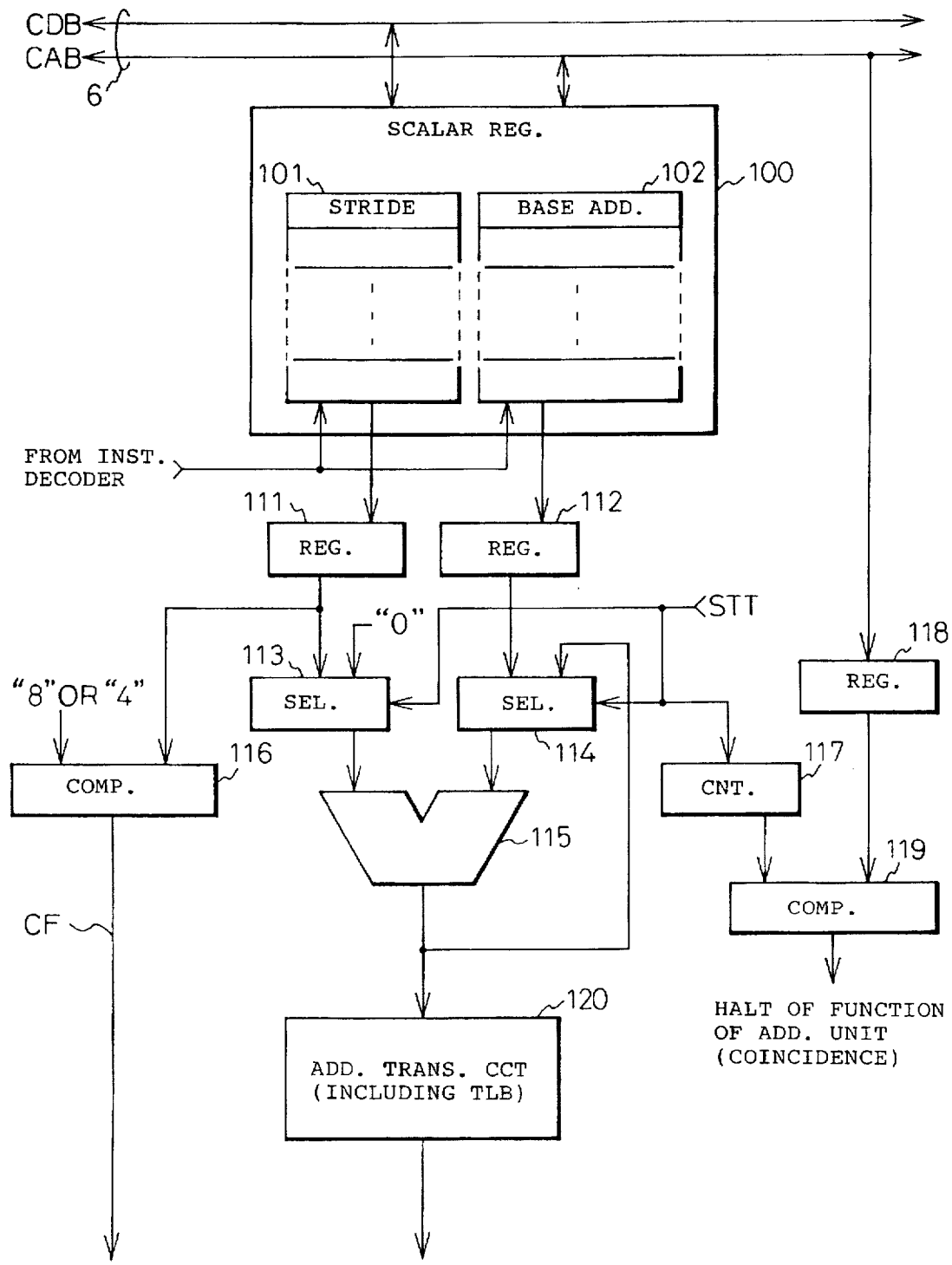
FIG. 9 is a block diagram that illustrates in detail the constitution of an address unit of FIG. 8.

FIG. 9 illustrates, in detail, the constitution of the address unit 10.

The address unit that is diagramed comprises a scalar register 100 having registers 101 and 102 which, respectively, store strides and base addresses that are taken in via chip data bus CDB and address bus CAB and output corresponding stride information and base address information depending upon the decoded result of the instruction decoder 13; registers 111 and 112 that temporarily store strides and base addresses read out from said registers 101 and 102, respectively, a selector 113 that selectively outputs either the data "0" or the data from the register 111 depending upon a load/store start signal STT, a selector 114 that selectively outputs either the data from the register 112 or the output data of an adder that is described below depending upon the load/store start signal STT, an adder 115 that adds output data of the selectors 113 and 114, a comparator 116 that compares the content of the register 111 with data "8" or "4S" to output the aforementioned cache freeze signal CF, a counter 117 that inputs the load/store start signal STT and counts the address that corresponds to the vector length (length of vector data), a register 118 that stores the data of a vector length taken in via the chip address bus CAB, a comparator 119 that compares the content of the register with the counted value of the counter 117, and an address translation circuit 120 that has a buffer (TLB) with an address translation table and which carries out address translation based on the output of the adder 115 by making reference to the above table.

In this constitution, the cache freeze signal CF is negated when the content of the register 111 is in agreement with the aforementioned predetermined data (data "8" indicating 8-byte distance in the case of double precision data or data "4" indicating 4-byte distance in the case of single precision data) in the comparator 116 (i.e., when the processor 1 makes a sequential data access to the cache memory 2). The cache freeze signal CF is asserted when they are not in agreement with each other (i.e., in the case of non-sequential data access). Furthermore, when the counted value (address corresponding to the vector length) of the counter 117 is in agreement with the content of the register 118, the comparator 119 produces a control signal for halting the function of the address unit 10. Moreover, the load/store start signal STT is produced at the start of reading the data out from the registers 101 and 102 in the scalar register 100. In this case, the above selectors 113 and 114, respectively, select and output data "0" and data from the register 112 at a moment when the load/store start signal STT is output, and then select and output data from the register 111 and output data from the adder 115.

Next, the cache memory control modes at the time of non-sequential data access will be described with reference to FIGS. 10a, 10b, 11a and 11b.

Figure 10A:
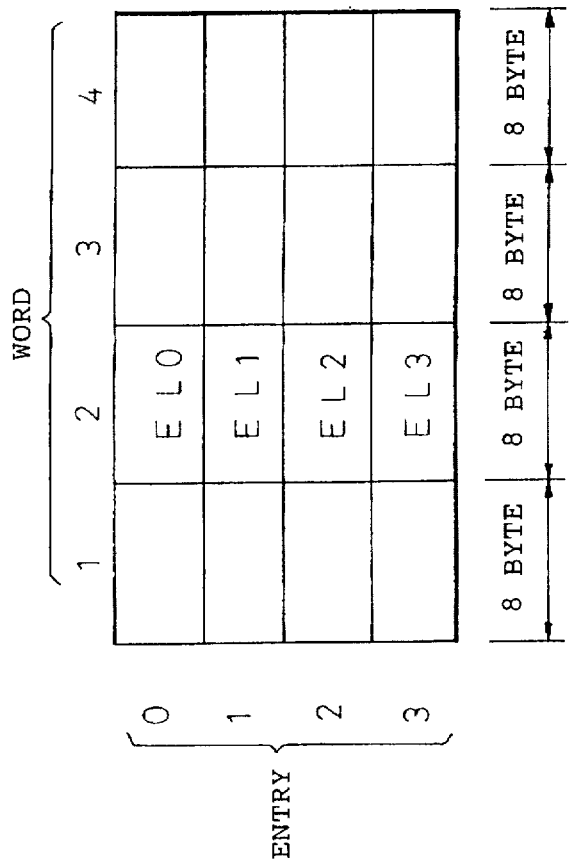
FIGS. 10a and 10b are diagrams illustrating a control mode in cache-hit state in the non-sequential data access according to an embodiment of the present invention.

In the diagramed example, the elements of vector data are arranged maintaining a gap (distance) of 32 bytes, the elements (EL0 to EL3) of vector data being arranged in the vertical direction at positions of the second words of the entries as shown in FIG. 10a.

Figure 10B:
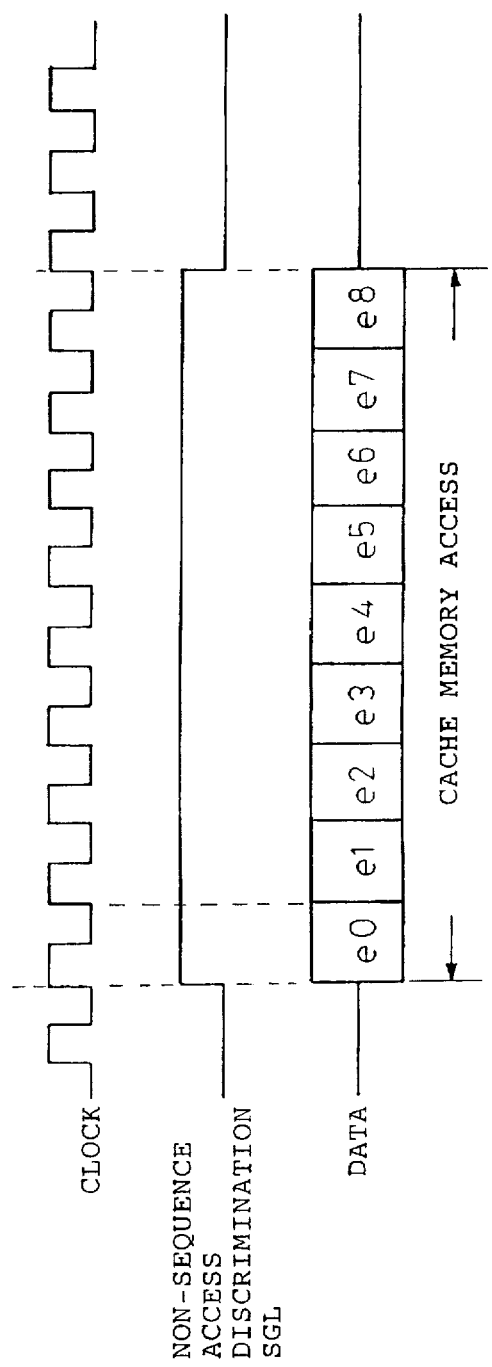

In the case of a cache hit as shown in FIG. 10b access, of the elements (e0 to e8) is made sequentially to in response to the clocks.

Figure 11A:
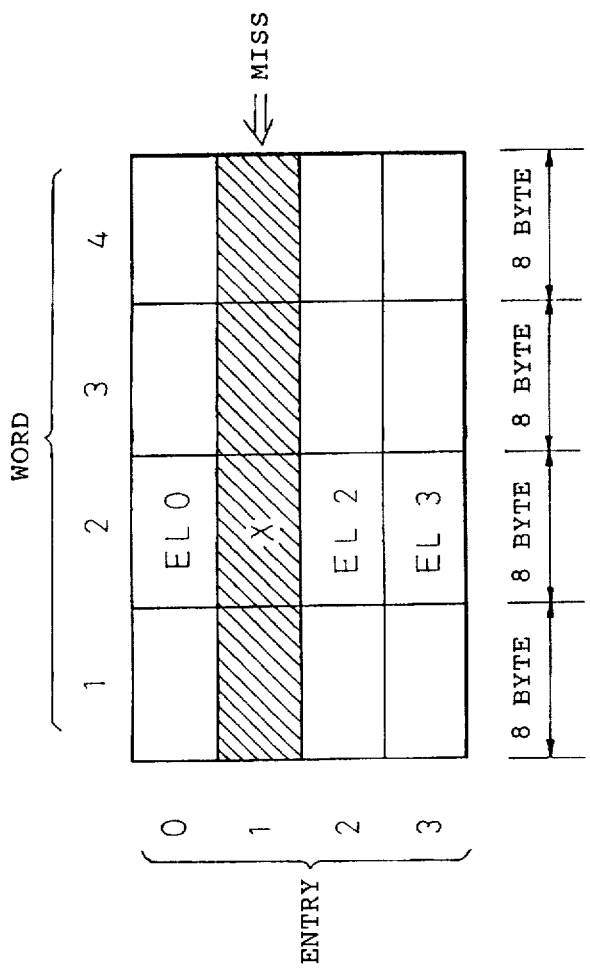
FIGS. 11a and 11b are diagrams illustrating a control mode in cache-miss state in the non-sequential data access according to the embodiment of the present invention.
Figure 11B:
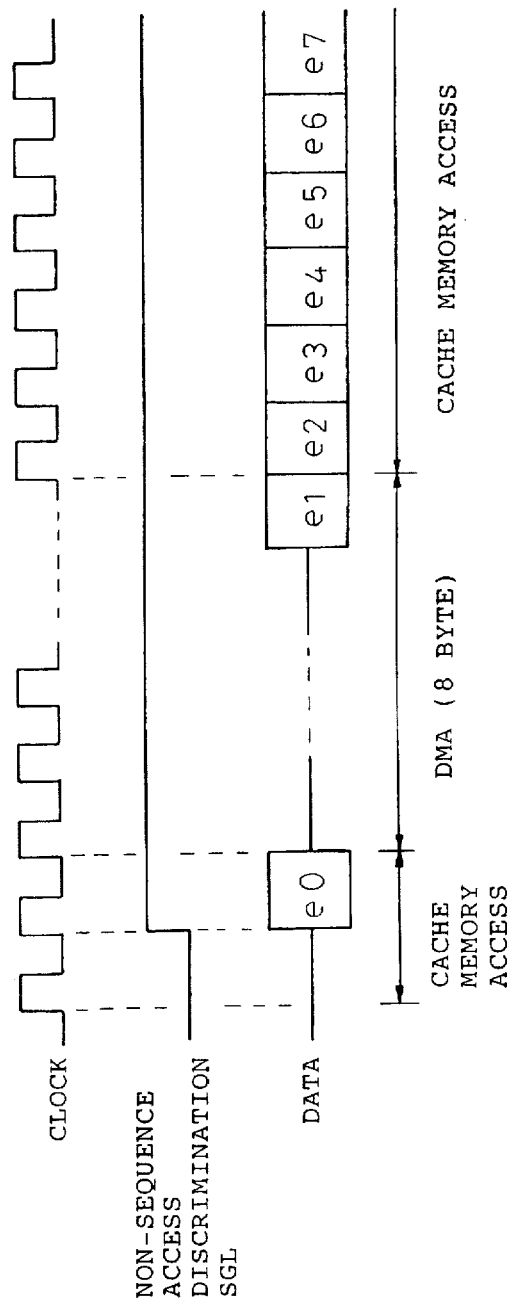

On the other hand, in the case of a cache miss, for example, in the case of a cache miss at the element 1 (EL1) shown in FIG. 11a, the non-sequence access discrimination signal S is asserted and the entry that includes the above element of a cache miss (entry 1 in the diagramed embodiment) is not updated and the element (EL1) is directly read out (in the case of reading operation) from the main memory 3. Therefore, the intial data are maintained under the condition that the entry 1 in the cache memory 2 is in a miss state. In the case of the writing operation, similarly, the entry in the cache memory 2 is not replaced in a cache-miss state but is dirctly written into the main memory 3.

The above control operation makes it possible to reduce the number of access times to the main memory 3 in a cache-miss state at the time of non-sequential data access from four times (corresponding to data of 32 bytes) down to one time (corresponding to data of 8 bytes), and the time needed for the cache-miss processing is reduced to one-fourth.

In this case, the entry 1 in the cache memory 2 remains in a cache-miss state but to which no access is gained at the time of access to the next element. Moreover, access of this entry is seldom gained at the time when access is made to the next vector data.

According to the control mode of this embodiment as described above, the cache memory 2 is informed of the kind of access (i.e., sequential data access or non-sequential data access) from the processor 1 at the time of memory access. In the case of non-sequential data access, unnecessary access to the main memory 3 is suppressed making it possible to reduce the penalty at the time of a cache miss without decreasing the hit rate of the cache memory 2. As a result, a high-speed operation is realized and the efficiency of the system as a hole can be improved.

| List of Reference Marks and Particulars | |
|---|---|
| Reference Marks | Particulars |
| 1 | processor |
| 1A | unit for outputting discrimination signal "S" |
| 2 | cache memory |
| 2A | unit for changing processing in cache-miss state |
| 3 | main memory |
| 10 | address unit |
| 21 | tag memory |
| 22,116,119 | comparator |
| 26,101,102,111,112,118 | register |
| 27 | data memory |
| 28,113,114 | selector |
| 29 | entry take-in control circuit |
| 117 | counter |
| S | non-sequence access discrimination signal |
| CF | cache freeze signal |
| HT | hit/miss indication signal |

We claim:

1. A processor for gaining access to data in a cache memory, comprising:

means for accessing said data in said cache memory by a sequential address data access or by a non-sequential address data access;

means for outputting a discrimination signal indicative of whether said accessing of said data in said cache memory is by said sequential address data access or by said non-sequential address data access;

means for causing said processor to cause said cache memory to execute a normal cache operation when the discrimination signal indicates said accessing of data is by said sequential address data access; and means for causing said processor to bypass said cache memory and to gain direct access to a main memory when the discrimination signal indicates said accessing of data is by said non-sequential address data access.

2. A processor according to claim 1, further comprising:

instruction control means for issuing an instruction and for decoding said issued instruction to produce a decoded instruction, wherein said discrimination signal is based on said decoded instruction.

3. A processor according to claim 1, wherein said means for outputting said discrimination signal comprises:

means for storing a plurality of stride information received from internal buses, the stride information indicating a distance among elements of vector data and having a value, and for being addressed by the decoded instruction and outputting stored and addressed stride information as output stride information; and means for comparing the value of said output stride information with a first predetermined data value and producing a comparison result indicative of whether the value of said output stride information coincides with the first predetermined data value, wherein said discrimination signal is asserted when the comparison result indicates the value of said output stride information does not coincide with the first predetermined data value.

4. A processor according to claim 3, wherein said means for outputting said discrimination signal negates said discrimination signal when the comparison result indicates the value of said output stride information coincides with the first predetermined data value.

5. A processor according to claim 3, wherein said means for outputting said discrimination signal comprises:

means for storing a plurality of base address information received via internal buses, each of said plurality of base address information indicating a respective reference address of corresponding vector data, and for being addressed by the decoded instruction and thereby selecting and outputting selected base address information, having a value, of said plurality of base address information stored therein;

first selection means for receiving, and selecting one of, the first and second inputs and producing a corresponding, first selected output;

second selection means for receiving, and selecting one of, the third and fourth inputs and producing a corresponding, second selected output;

adding means for adding the first and second selected respectively outputs of the first and second selection means and producing an added data output;

the first and second inputs to the first selection means respectively comprising a first predetermined data value and a value of said output stride information, the third and fourth inputs to the second selection means comprising said output base address information and a value of the added data output of the adding means; and means for effecting address translation processing of said added data output of said adder means by accessing an address translation table.

6. A processor according to claim 5, wherein said first and second selection means selectively output said second predetermined data value and the value of said selected base address information when a load/store of the vector data is started, and selectively output the value of said output stride information and said added data after said load/store operation is started.

7. A processor according to claim 5, wherein:

said vector data has a length; and said means for outputting said discrimination signal further comprises:

counter means for commencing a counting operation when a load/store of vector data is started and producing a counted value corresponding to a length of the vector data;

register means for storing data received from an internal address bus and defining the length of the vector data; and means for comparing the vector data length stored in said register means with the counted value of the vector data length counted by said counter means;

wherein said outputting of said discrimination signal is halted when the length of the vector data stored in said register means coincides with the counted value of vector data length value counted by said counter means.

8. A processor according to claim 1, wherein said processor is a one-chip vector operation type processor.

9. A system comprising:

a cache memory;

a main memory; and a processor connected to said cache memory and said main memory and comprising:

means for accessing data stored in said cache memory selectively by sequential data access or by non-sequential data access;

means for outputting a discrimination signal indicative of whether the accessing of said cache memory is a sequential access data address or a non-sequential address data access;

means for causing said processor to cause said cache memory to execute a normal cache operation when the discrimination signal indicates said accessing of data is by said sequential address data access;

means for causing said processor to bypass said cache memory and to gain direct access to said main memory when the discrimination signal indicates said accessing of data is by said non-sequential address data access; and said cache memory, in a cache-miss state and responsive to said discrimination signal received from said processor indicating a non-sequential address data access, discontinuing said normal cache operation and maintaining initial data stored therein, prior to the non-sequential address data access, without change.

10. A system according to claim 9, wherein:

said cache memory comprises a plurality of entries storing corresponding data elements, and the data elements, as stored in the plurality of entries in said cache memory, are arranged such that a distance between said elements is maintained, thereby to inhibit access to one of said plurality of entries in the cache-miss state when access is made to a next element.

11. A system according to claim 9, wherein:

said cache memory comprises a plurality of entries storing respective data elements, each of said entries being in a cache-hit state or a cache-miss state and, in response to said discrimination signal indicating a non-sequential address data access in the cache-miss state, said cache memory ceases normal cache operation, terminating any further updating of entries.

12. A system according to claim 11, wherein said means for directly accessing said main memory comprises:

means for controlling whether one entry, of said entries, of data from said main memory should be fetched when said discrimination signal is asserted, said means for controlling producing a control signal;

means for fetching said one entry of data from said main memory onto external buses in response to the control signal;

register means for temporarily storing the data from an external bus, based upon the control signal; and selection means for selecting said data temporarily stored in said register means in a cache-miss state and sending said data from said register means to said processor.

13. A system according to claim 12, wherein said cache memory comprises:

first memory means for storing addresses, each stored address corresponding to one of said entries received from the external bus;

means for comparing said stored addresses with addresses received from said external bus and producing an address comparison signal; and second memory means for receiving the data from said register means when said discrimination signal is negated in the cache-miss state, wherein, based on the address comparison signal, said selection means selectively outputs the data from said second memory means when a cache-hit state occurs and outputs the data from said register means when a cache-miss state occurs.

14. A system according to claim 13, wherein said processor comprises:

instruction control means for issuing an instruction and decoding said instruction to produce a decoded instruction;

means for storing a plurality of stride information received from internal buses, said stride information indicating a distance among the elements of said data and having a value, and outputting selected stride information depending upon the decoded instruction generated by said instruction control means, said selected stride information having a value; and means for comparing the value of said selected stride information with a predetermined data value and producing a comparison result, wherein, based on the comparison result, said discrimination signal is asserted when the value of said selected stride information does not coincide with the predetermined data value, and said discrimination signal is negated when the value of said selected stride information coincides with the predetermined data value.

15. A method of controlling a cache memory in a system equipped with said cache memory connected to a processor and a main memory, comprising the steps of:

sending a discrimination signal from said processor to said cache memory, said discrimination signal indicating whether an access to said cache memory is a sequential address data access or a non-sequential address data access; and when said discrimination signal indicates the non-sequential address data access in the cache-miss state, said processor causing said cache memory to cease performing a normal cache operation when the discrimination signal indicates said accessing of data is by the sequential address data access and said processor and, instead, bypasses said cache memory and gains direct access to said main memory when the discrimination signal indicates said accessing of data is by the non-sequential address data access.

16. A control method according to claim 15, wherein the step of causing the cache memory to cease performing a normal cache operation further comprises directly accessing said main memory without updating an entry of said cache memory that is in the cache-miss state when said discrimination signal is asserted.

* * * * *

UNITED STATES PATENT AND TRADEMARK OFFICE
CERTIFICATE OF CORRECTION

PATENT NO. : 5,724,548
DATED : Mar. 3, 1998
INVENTOR(S) : TAKAHASHI et al.

It is certified that error appears in the above-identified patent and that said Letters Patent is hereby corrected as shown below:

TITLE PAGE:
[56] References Cited, under FOREIGN PATENT DOCUMENTS, change "59-14977" to --59-214977--.

Col. 1, line 48, after "miss"" insert --,--.

Col. 2, line 55, after "That is" insert --,--.

Col. 3, line 49, change "byway" to --by way--.

Col. 6, line 23, change "," to --;--.

Col. 7, line 22, change "respectively," to --respectively;--;
line 24, change "STT," to --STT;--;
line 26, after "below" insert --,--;
line 27, change "STT," to --STT;--;
line 28, change "114," to --114;--;
line 31, change "CF," to --CF;--;
line 33, change "data)," to --data);--;
line 36, change "117," to --117;--.

Signed and Sealed this

Sixteenth Day of June, 1998

Attest:

BRUCE LEHMAN

*Attesting Officer*     *Commissioner of Patents and Trademarks*